United States Patent [19]

Taricco

[11] Patent Number: 5,274,356
[45] Date of Patent: Dec. 28, 1993

[54] METHODS AND APPARATUS FOR THE INSPECTION OF AIR CARGO FOR BOMBS

[76] Inventor: Todd L. Taricco, 3806 El Tesoro Pl., Rancho Palos Verdes, Calif. 90274

[21] Appl. No.: 63,113

[22] Filed: May 17, 1993

Related U.S. Application Data

[63] Continuation of Ser. No. 682,906, Apr. 9, 1991, abandoned.

[51] Int. Cl.⁵ .................. G08B 29/00; F42B 33/00; G01N 17/00
[52] U.S. Cl. .................. 340/515; 340/591; 340/626; 73/35; 73/865.6; 86/50; 89/1.14
[58] Field of Search .............. 340/515, 551, 552, 567, 340/626, 591, 614; 73/35, 865.6; 169/30, 75; 86/50; 89/1.14, 1.11

[56] References Cited

U.S. PATENT DOCUMENTS

| | | | |
|---|---|---|---|
| 4,478,126 | 10/1984 | Holmlund et al. | 86/50 |
| 4,847,790 | 7/1989 | Suzuki et al. | 73/865.6 |
| 4,866,439 | 9/1989 | Kraus | 340/945 |

*Primary Examiner*—Donnie L. Crosland
*Attorney, Agent, or Firm*—Blakely, Sokoloff, Taylor & Zafman

[57] ABSTRACT

Methods and apparatus for the inspection of air cargo including passenger luggage for pressure sensitive bombs. In accordance with the method, the air cargo is placed in a pressure vessel, which is then pressure cycled between a super-ambient pressure and a sub-ambient pressure duplicating the pressure at a substantial altitude. Cycling in this manner will trigger pressure sensitive switches set to set off, or initiate a timing device to set off, a terrorist bomb. The apparatus includes a pressure vessel with large blowout ports for venting the same to the atmosphere upon an extraordinary pressure rise indicative of the detonation of an explosive charge within the chamber. Also preferably located within the chamber are sensors, typically electromagnetic noise sensors, for sensing electromagnetic radiation characteristic of a switch closure turning on current to a bomb timing device. The pressure vessel, being a metallic enclosure or at least having a conductive layer, acts as a screen room, isolating the pressure vessel interior from external electromagnetic radiation. Other aspects of the methods and apparatus are disclosed.

10 Claims, 1 Drawing Sheet

METHODS AND APPARATUS FOR THE INSPECTION OF AIR CARGO FOR BOMBS

This is a continuation of application Ser. No. 07/682,906 filed on Apr. 9, 1991, now abandoned.

BACKGROUND OF THE INVENTION

1. Field of the Invention

The present invention relates to the field of air cargo screening systems for the detection of the presence of explosive devices therein.

2. Prior Art

In recent years, there has been an increasing threat and occurrence of actual bombings by various terrorist groups. Of particular concern is the possible placement of bombs on commercial aircraft, both because the actual bombing on the aircraft normally leads to a great loss of life and to great property damage, and because the mere threat or potential of such bombings has at least at times had gross adverse affects on the tourist and the airline industries.

One type of bomb which terrorists have used with success is a bomb which has a pressure sensitive trigger device which may require a pressure cycling between normal atmospheric (airport level) pressure and a reduced pressure characteristic of flight at normal altitudes a predetermined number of times, such as one or two, before the bomb is initiated upon an additional drop in pressure indicative of another flight at altitude. It is believed that in at least some cases, the pressure sensitive trigger device does not itself set off the bomb, but rather initiates a timing device set to trigger the bomb before the then current flight is over. Thus, a bomb may be placed in air cargo for a particular destination, to go off in the second or third leg of the trip to the air cargo destination, with the bomb being successfully set off during the desired leg of the trip, independent of intervening flight delays and the like.

Inspection techniques for the inspection of passengers, carry on baggage, stowed (checked) baggage and other more general forms of air cargo are well known. Such techniques generally include x-raying of baggage, the use of metal detectors for searching passengers themselves, and the use of dogs for sniffing out explosive materials. However, the shear volume and the nature of air cargo in general typically limits such inspection to specialized categories, such as baggage and carry on articles, as air cargo is voluminous and varies a great deal in packaging method, metal content, etc. Consequently, there has been no practical way to successfully inspect general air cargo for pressure sensitive bombs of the type described, as such bombs may be packaged with other materials making the discovery of the same almost impossible without the unpacking, even perhaps the disassembling of each item of any substantial size being shipped.

BRIEF SUMMARY OF THE INVENTION

Methods and apparatus for the inspection of air cargo including passenger luggage for pressure sensitive bombs are disclosed. In accordance with the method, the air cargo is placed in a pressure vessel, which is then pressure cycled between a super-ambient pressure and a sub-ambient pressure duplicating the pressure at a substantial altitude. Cycling in this manner will trigger pressure sensitive switches set to set off, or initiate a timing device to set off, a terrorist bomb. The apparatus includes a pressure vessel with large blowout ports for venting the same to the atmosphere upon an extraordinary pressure rise indicative of the detonation of an explosive charge within the chamber. Also preferably located within the chamber are sensors, typically electromagnetic noise sensors, for sensing electromagnetic radiation characteristic of a switch closure turning on current to a bomb timing device. The pressure vessel, being a metallic enclosure or at least having a conductive layer, acts as a screen room, isolating the pressure vessel interior from external electromagnetic radiation. Other aspects of the methods and apparatus are disclosed.

DETAILED DESCRIPTION OF THE INVENTION

Figure 1:
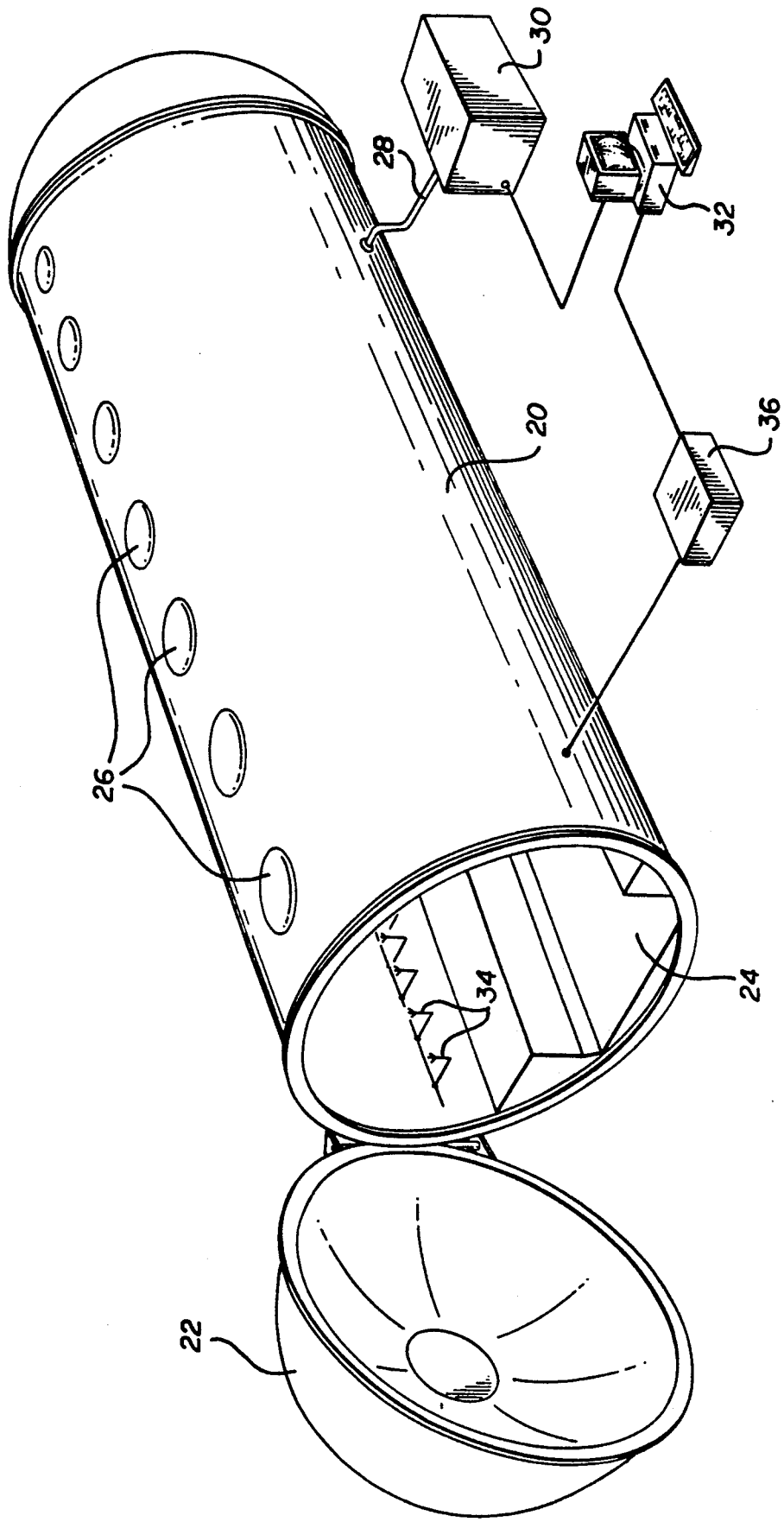
FIG. 1 is a perspective schematic view of one embodiment of the invention.

First referring to FIG. 1, an illustration of a large pressure vessel may be seen. In that regard, the use of the phrase pressure vessel herein and in the appended claims is meant to mean a vessel having one or more doors thereon, which when closed, form a sealed enclosure capable of withstanding a substantial positive (super-ambient internal pressure) and negative (sub-ambient internal pressure) differential pressures. The pressure vessel preferably is a metallic enclosure, and therefore when the door or doors thereof are closed, forms a complete metal enclosure shielding the interior volume thereof from substantially all external electromagnetic radiation. The pressure vessel illustrated in FIG. 1 is preferably large enough to receive air cargo shipping containers on some appropriate form of wheeled dolly, or alternatively, some form of conveyor so that such containers may be slid off of a dolly and into the pressure vessel for inspection, and of course readily returned to the dolly after the inspection.

In the specific embodiment illustrated in FIG. 1, the pressure vessel 20 has a single door 22 at the front thereof, and some form of floor for receiving a dolly, or conveyor, such as a roller conveyor 24, for receiving air cargo. Also preferably blowout ports 26 are provided across the top of the pressure vessel 20, which ports will blow out to vent the interior of the pressure vessel to ambient pressure upon the buildup of the pressure within the pressure vessel to some pressure well above normal operating pressures, but of course still well below the rupture pressure for the pressure vessel. Obviously, while only one door 22 is shown on FIG. 1, a second door may be disposed conveniently at the other end of the pressure vessel so that the same may be loaded from one end and unloaded from the other end, if desired.

Coupled to the pressure vessel 20 though an air line 28 is an air pump or compressor 30 controlled by a controller 32. In use, it is desired to reduce the pressure within the pressure vessel to a predetermined level below ambient pressure and to a predetermined value above ambient pressure. Accordingly, pump or compressor 30 should be capable of producing positive or negative pressures with the respect to ambient pressure, or alternatively might be two devices, one for producing a sub-ambient pressure at its output and the other for producing a super-ambient pressure. Depending upon the nature of compressor 30 one chooses to use, a single compressor may appropriately be used, with valving to couple line 28 to the low pressure side of compressor 30 or to the high pressure side of the compressor, and to vent the same to ambient pressure. Thus a single compressor could be used in this way to pump up or pump down the pressure within the pressure vessel upon command.

The controller 32 is preferably some form of automatic programmable controller, such as by way of example, a personal computer with appropriate interface therein so as to be programmable to automatically cycle the pressure within pressure vessel 20 between a pressure corresponding to a substantial altitude, such as 5,000 to 10,000 feet, and a super-ambient pressure, such as, by way of example, a pressure in the range of 15 to 20 psia and more preferably at least 16 to 20 psia.

Disposed within the pressure vessel 20 are one or more sensors 34 coupled to a receiver/warning system or monitor 36, which in turn may be coupled to the controller 32 as shown. The sensors 34 preferably may be any form of electromagnetic radiation sensors suitable for detecting electromagnetic radiation and noise characteristic of a switch turning on power to a electronic device. In particular, in pressure sensitive bombs of the type used by terrorists, the triggering device mechanically senses changes in pressure, and upon a preset number of pressure cyclings (typically a small number such as one or two) each indicative of a takeoff and a landing, a trigger mechanism turns on electrical power to a time for the bomb upon a subsequent drop in pressure indicative of the takeoff for another leg of the journey. A switch closure turning on power to an electronic device normally will cause the switch and lead wires through which the current surge passes to emit electromagnetic radiation, normally as a fairly wide band noise pulse, as mechanical switches generally exhibit contact bounce which increases the amplitude and extends the duration of the resulting electromagnetic noise. Because of the shielding effects of the pressure vessel, there is a virtual absence of other interfering electromagnetic noise within the pressure vessel, allowing high gain equipment to sense any significant electromagnetic radiation, and more particularly any significant change in internal electromagnetic radiation within the pressure vessel. Suitable sensors may include antennas of various kinds, including simple metallic antennas and ferrite antennas, though preferably a plurality of such sensors are used, perhaps of different kinds and preferably if directional, oriented in different directions to maximize the opportunity for detection of such a switch closure. Also, one or more sensors on cables may be disposed on or directly within the air cargo for better sensing capability. By way of specific example, air cargo packaged within an aluminium shipping container preferably would have such a sensor disposed within the shipping container, as such containers themselves may provide undesired shielding of the radiation given off by such switch closures.

In operation, air cargo, which may be or include baggage and even carry on items, would be loaded into the pressure vessel 20, and if moveable electromagnetic sensors are used, electromagnetic sensors appropriately disposed with respect to the air cargo. Thereafter the pressure vessel 20 will be sealed and then controller 32 initiated. The controller 32 will normally be programmed to first reduce the pressure in pressure vessel 20 to a pressure at least below the pressure the cargo would be expected to encounter in flight. Suitable reduced pressures might be by way of example a pressure corresponding to approximately 5,000 to 10,000 feet or perhaps even higher. Normally the time required to pump the pressure vessel down to such a reduced pressure would itself be adequate for the operation of a pressure sensitive detonation device, so that dwelling at the reduced pressure for a significant length of time will not normally be required. Thereafter the controller 32 would allow the pressure in the pressure vessel 20 to return to ambient, either by reversing the connections of compressor 30 or alternatively merely venting line 28 to ambient pressure, with the compressor 30 then pressurizing the chamber to a super-ambient pressure, again adequate to advance a pressure sensitive detonation device in its operating cycle. The super-ambient pressure may be in the range of 15 to 20 psia, or more preferably at least 16 to 20 psia, though higher pressures may be used if desired. Depending upon the nature of the air cargo, it may be possible to pressurize the pressure vessel 20 to quite a high pressure such as 25 to 50 psia or even higher with the intent of damaging and rendering inoperative any such pressure sensitive detonation device. In any event, the controller 32 will normally be preprogrammed to cycle between these sub-ambient pressures and the super-ambient pressures a predetermined number of times, typically at least three, or alternatively, at least a number of times equal to or greater than the number of pressure cycles corresponding to the number of takeoffs and landings before the air cargo is to be unloaded at its final destination.

During the pressure cycling, the sensor monitor 36 may monitor the various radiation sensors within the pressure vessel and upon the detection of a switch closure, will provide an audible alarm, and may provide a signal to the controller 32 to perhaps immediately vent the pressure vessel 20 so that the contents thereof may be immediately removed and moved to a remote or armored location, or alternatively to drive the pressure in the pressure vessel 20 to a level that is calculated to allow the pressure vessel to best withstand the detonation of an explosive charge therein, such as a grossly reduced pressure. Also such sensing may be used to cause the controller to pressure cycle the pressure vessel additional times, particularly if a switch closure is detected without a following detonation within a reasonable time thereafter. In that regard, while the preferred embodiment pressure vessel described herein is a fabricated steel pressure vessel, it should be noted that the same may be lined with an energy absorbing composite material for impact absorption in the event of an explosion within the vessel, or alternatively the main structure of the vessel itself may be a high strength composite material, although in any event, if electromagnetic sensors are to be used within the pressure vessel as described, the pressure vessel or at least some layer thereof should be conductive or should at least include a conductive screen to shield the interior from exterior electromagnetic radiation to avoid false sensing of external light switch operation, vehicle starter solenoid operation, etc.

While the preferred embodiment of the apparatus and methods of the invention have been disclosed and described herein, it will be understood by those skilled in the art that various changes in form and detail may be made therein without departing from the spirit and scope thereof.

I claim:

1. A method of pressurizing air cargo comprising the steps of:

(a) placing the air cargo in a closable vessel having a vessel wall capable of withstanding a substantial differential pressure thereacross, said closable vessel initially having an ambient pressure;

(b) decreasing the pressure within the vessel to a sub-ambient pressure;

(c) increasing the pressure within the vessel to a super-ambient pressure;

(d) repeating steps (b) and (c) a predetermined number of times wherein if the air cargo contains a pressure sensitive explosive, the pressure sensitive explosive is deotonated by repeating steps b and c a predetermined number of times; and, (e) removing the air cargo from the vessel.

2. The method of claim 1 further comprising the step of loading the air cargo onto an aircraft in not less than a predetermined time after the pressure cycling of step (b).

3. The method of claim 1 wherein the vessel includes sensing means for sensing electrical noise within the vessel characteristic of a barometric electrical switch closure, and further including the steps of monitoring the sensing means and providing a warning upon the sensing of electrical noise within the vessel possibly indicative of a barometric electrical switch closure.

4. The method of claim 3 wherein upon the sensing of electrical noise within the vessel possibly indicative of a pressure sensitive electrical switch closure, the pressure is cycled an additional number of times around the pressure at which the noise was sensed.

5. The method of claim 1 wherein the vessel is provided with large blowout ports for venting the inside of the vessel to ambient pressure upon the extraordinary rise of pressure in the vessel indicative of the detonation of an explosive charge within the vessel.

6. The method of claim 1 wherein the super-ambient pressure is a pressure of less than approximately 20 pounds per square inch absolute.

7. The method of claim 6 further comprising the step of pressurizing the vessel with the air cargo therein to a pressure substantially above the super-ambient pressure at least once.

8. An apparatus that can pressurize air cargo that may contain pressure sensitive explosives comprising:
- a pressure vessel containing a fluid at ambient pressure, said pressure vessel being adapted to contain the air cargo;
- means for pressurizing the fluid within the vessel between a sub-ambient pressure corresponding to a substantial altitude and a super-ambient pressure a predetermined number of times; and,
- sensing means within the pressure vessel for sensing the existence of electrical noise within the vessel that may be emitted from a pressure sensitive explosive in the air cargo and providing an indication of the existence of said electrical noise.

9. The apparatus of claim 8 wherein the vessel has large blowout ports for venting the inside of the vessel to ambient pressure upon the extraordinary rise of pressure in the vessel indicative of the detonation of an explosive charge within the vessel.

10. An apparatus that can pressurize air cargo that may contain pressure sensitive explosives, comprising:
- a closable vessel which can house the air cargo and that has a vessel wall capable of a withstanding a substantial differential pressure thereacross;
- pressure cycling means for decreasing the pressure within the vessel to a sub-ambient pressure and then increasing the pressure within the vessel to a super-ambient pressure, wherein if the air cargo contains a pressure sensitive explosive, the pressure sensitive explosive is detonated by decreasing the pressure within the vessel to a sub-ambient pressure and then increasing the pressure within the vessel to a super-ambient pressure.

* * * * *